Jan. 14, 1941.  F. H. W. MILLER  2,228,839
MECHANICAL MOVEMENT
Filed Oct. 16, 1939  2 Sheets-Sheet 1
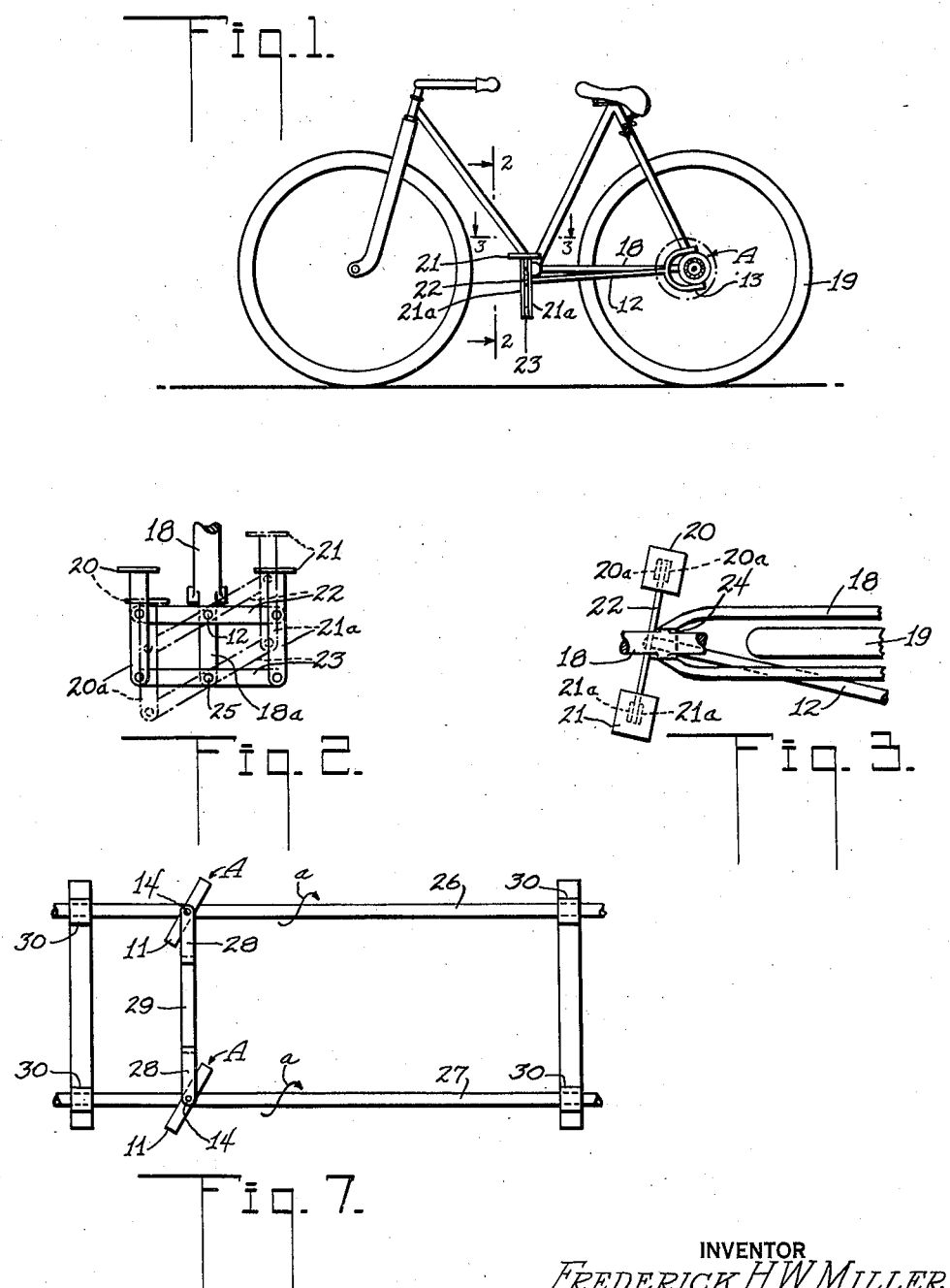
INVENTOR
FREDERICK H. W. MILLER
BY
ATTORNEY

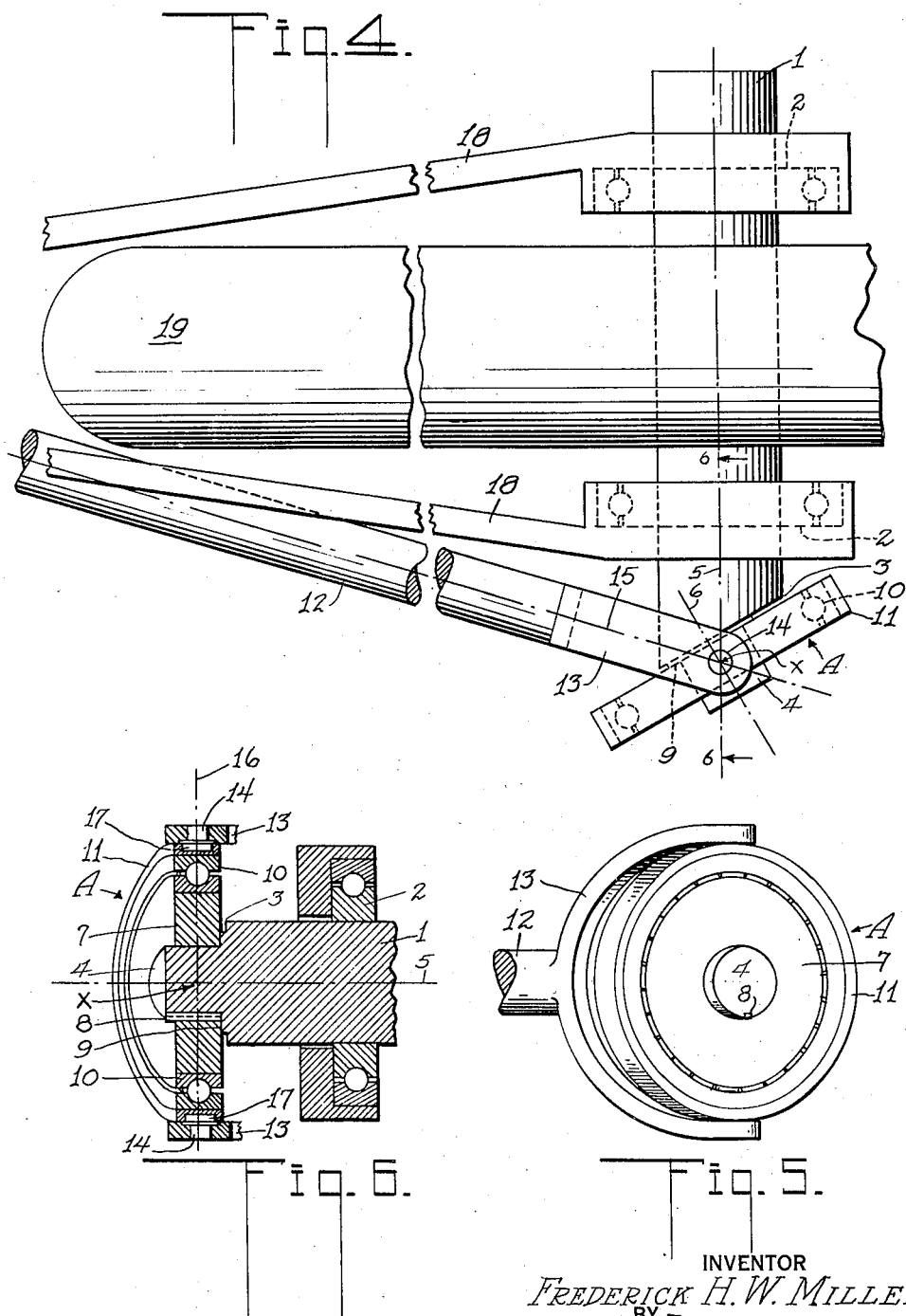

Patented Jan. 14, 1941

2,228,839

UNITED STATES PATENT OFFICE 2,228,839

MECHANICAL MOVEMENT

Frederick H. W. Miller, Napa, Calif.

Application October 16, 1939, Serial No. 299,650

1 Claim. (Cl. 74—60)

My invention relates to improvements in a mechanical movement, and it consists of the combinations, constructions and arrangements hereinafter described and claimed.

An object of my invention is to provide a mechanical movement for transmitting rotary motion from a shaft into a rocking motion in a second shaft or vice versa. The mechanical movement can be used in various types of machines and I have illustrated only two of its uses in the drawings. A bicycle is shown with my mechanical movement interconnecting the pedals with the rear axle. I further show two rotatable shafts interconnected by the mechanical movement.

A further object of my invention is to provide a device of the type described which is extremely simple in construction and durable and efficient for the purpose intended.

Other objects and advantages will appear in the following specification, and the novel features of the device will be particularly pointed out in the appended claim.

My invention is illustrated in the accompanying drawings forming a part of this application, in which Figure 1 is a side elevation of a bicycle showing my device operative applied;

Figure 2 is an enlarged section taken along the line 2—2 of Figure 1;

Figure 3 is an enlarged section taken along the line 3—3 of Figure 1;

Figure 4 is a full-size horizontal view of the mechanical movement applied to the bicycle;

Figure 5 is an end view of a portion of Figure 4;

Figure 6 is a section taken along the line 6—6 of Figure 4; and

Figure 7 is a diagrammatic plan view showing two rotatable shafts interconnected by my mechanical movement.

In carrying out my invention I will first describe the mechanical movement shown in Figures 4 to 6 inclusive, and then will give two illustrations of the mechanical movement applied to specific devices. In Figure 4 I show a rotatable shaft 1 supported in roller bearings 2. One end of the shaft is bevelled as at 3 and carries an integral hub 4. It will be noted that the axis 5 of the shaft intersects the inclined axis 6 of the hub at $x$.

A swash plate indicated generally at A has a disc 7, see Figure 6, keyed to the hub 4 at 8. The disc 7 is spaced slightly from the inclined end 3 by an enlargement 9 formed integral with the shaft. A roller bearing 10 is mounted on the periphery of the disc and rotatably carries a ring 11. Any type of connection between the ring 11 and the disc 7 may be used so long as there is a free rotative movement between the two parts.

A rockable shaft 12 has a forked end 13 which is pivotally secured to the ring 11 at 14. The axis 15 of the rockable shaft intersects the axes 5 and 6 at the point $x$, see Figure 4. The axis 16 of the pivotal connection 14 between the shaft 12 and the ring 11, also intersects the axes 5, 6 and 15 at the point $x$, see Figure 6. Any type of pivotal connection between the fork 13 and the ring 11 may be used and in Figure 6 I show the connection as consisting of pins 14 having their inner ends rotatably received in ball bearings housed in cups 17 which in turn are carried by the ring 11.

From the foregoing description of the various parts of the device, the operation thereof may be readily understood.

The shaft 1 when continuously rotated, will impart a movement to the disc 7 that will cause the ring 11 to oscillate and rock the shaft 12 about its longitudinal axis 15. The reverse is also true; that is, if the shaft 12 is rocked, it will actuate the swash plate A for continuously rotating the shaft 1.

As already stated, the device can be used on a number of machines and I have shown its use on a bicycle in Figures 1 to 3 inclusive. The bearings 2 can constitute the rear bearings in a bicycle frame 18, see Figures 1 and 4, and the shaft 1 becomes the rear axle of the bicycle. The shaft carries a rear wheel 19. The shaft 12 is rocked by means of pedals 20 and 21 pivotally mounted on cross-arms 22 and 23, see Figure 2. Figure 3 shows the shaft 12 extending through a bearing 24 in the frame 18 and being rigidly connected to the upper cross-arm 22.

A rocking of the cross-arm caused by the up and down movement of the pedals 20 and 21 as indicated by the broken line position in Figure 2, will rock the shaft 12 and continuously rotate the shaft 1 for propelling the bicycle. The pedals 20 and 21 are continuously maintained in parallel relation by the pivotal connection of their shanks 20a and 21a with the cross-arms 22 and 23. The cross-arm 23 is pivoted at 25 to a depending portion 18a of the frame 18, see Figure 2. The inclined angle, made by the cross-arms 22 and 23, with the rear fork of the bicycle frame is shown exaggerated in Figure 3. In actual practice, the cross-arms will extend substantially at right angles to the rear fork. The pedals 20 and 21 will be vertically moved rather than rotated through a circle as is now the practice with standard bicycles.

In Figure 7, I show my mechanical movement connecting two rotatable shafts 26 and 27 together. Swash plates A are mounted on both shafts and their outer rings 11 are interconnected by the forked ends 28 of a rockable shaft 29. The shafts 26 and 27 are supported in bearings 30. When either of the shafts 26 or 27 is rotated in the direction of the arrows shown at a, the swash plate A associated with the shaft will rock the shaft 29, and the shaft 29 will cause the other swash plate A to rotate the second shaft. It is also possible to rotate both shafts 26 and 27 by rocking the shaft 29. Such a construction does away with a belt and pulley connection between the shafts and also permits the shafts 26 and 27 to be interconnected even though they do not extend in parallel relation with each other.

Although I have shown the mechanical movement used for propelling a bicycle or for interconnecting two shafts, it is possible to adapt the device for propelling locomotives and automobiles driven by steam-engines. Marine engines, stationary gas engines and power hammers may also utilize the mechanical movement to advantage. The mechanical movement may further be used in timing devices, steering mechanisms, mechanical devices for toys, pump jacks, power agitators for paint mixers, etc. In fact, any place where it is desired to transfer a rotary motion into a rocking motion or vice versa, my device can be used.

While I have shown only the preferred form of my invention, it should be understood that various changes or modifications may be made within the scope of the appended claim without departing from the spirit of the invention.

The swash plate A shown in Figure 1 may be housed within a circular casing shown by the dotted circle in this figure. This will protect the parts from foreign matter. The circular casing although shown protecting the swash plate when applied to a bicycle, can also be applied to the mechanical movement when used for other purposes. A light oil can fill the casing and thus keep the parts in perfect lubrication.

In order to prevent the swash plates A that connect the shaft 29 with the shafts 26 and 27 (see Figure 7) from stopping on dead center position where the forces will balance each other, I can provide a flywheel (not shown) to either or both of the shafts 26 and 27 or can interconnect the two shafts with another shaft and swash plate (not shown), the second set of swash plates being connected to the shafts 26 and 27 at a different angle than the swash plates A. This will insure immediate starting of the parts when either shaft 26 or 27 is rotated or the shaft 29 is rocked.

I claim:

In combination, two shafts having their axes lying in the same plane and intersecting each other at an acute angle, one of the shafts being rotatable and carrying an eccentrically-mounted hub whose axis is inclined to the shaft axis and intersects therewith at the same point as the two shaft axes, a ring rotatably connected to the hub and having its plane extending at right angles to the hub axis, the other shaft being rockable and having a forked end pivotally connected to the ring, whereby a rocking of the last-named shaft will rotate the first shaft.

FREDERICK H. W. MILLER.